(12) United States Patent
Yonak (10) Patent No.: US 7,570,432 B1
(45) Date of Patent: Aug. 4, 2009

(54) METAMATERIAL GRADIENT INDEX LENS

(75) Inventor: Serdar H. Yonak, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 12/027,337

(22) Filed: Feb. 7, 2008

(51) Int. Cl.
*G02B 3/00* (2006.01)
(52) U.S. Cl. ...................................... 359/652; 359/655
(58) Field of Classification Search .......... 359/652–655
See application file for complete search history.

(56) References Cited

U.S. PATENT DOCUMENTS 4,601,545 A 7/1986 Kern
5,080,472 A * 1/1992 Gupta ........................ 359/652
7,218,285 B2 5/2007 Davis et al.

FOREIGN PATENT DOCUMENTS

WO WO-2006/023195 3/2006

* cited by examiner

*Primary Examiner*—William C Choi
(74) *Attorney, Agent, or Firm*—Gifford, Krass, Sprinkle, Anderson & Citkowski, P.C.

(57) ABSTRACT

Examples of the present invention include a gradient index element formed from a material such as a metamaterial, the material having an index profile and an index gradient profile, where the index profile includes at least one discontinuity and the index gradient profile is substantially continuous.

19 Claims, 11 Drawing Sheets

METAMATERIAL GRADIENT INDEX LENS

FIELD OF THE INVENTION

The invention relates to gradient index materials, such as gradient index metamaterials, and applications thereof.

BACKGROUND OF THE INVENTION

Metamaterials are typically artificially structured composite materials. Components and structural parameters may be selected to obtain electromagnetic properties that are not readily available in a homogeneous material.

The electromagnetic response of metamaterials is discussed in Int. Pub. WO 2006/023195 to Smith et al. In some metamaterial examples, permittivity and/or permeability may be negative at the electromagnetic frequency of interest. A metamaterial typically comprises a plurality of unit cells. In typical examples, each unit cell includes an electrically conducting pattern, such as a resonator, for example a split ring resonator, supported on a dielectric substrate. The metamaterial response may be determined from the unit cell parameters. Unit cell parameters include parameters such as resonant frequency.

However, the range of unit cell parameters available may have an effective upper and lower bound, for example due to manufacturing limitations such as physical limits on a size variation. Such limitations conventionally present a restriction on the index variation possible within a metamaterial, and limit applications of a metamaterial.

SUMMARY OF THE INVENTION

Embodiments of the present invention include materials, such as metamaterials, having an index profile, and applications thereof in elements such as lenses. In a representative example, a metamaterial has an index profile having one or more discontinuities, whereas the corresponding refractive index gradient is substantially continuous over the same region.

An example lens comprises a medium having a spatial index profile and a corresponding index gradient that is a derivative thereof, the spatial index profile including a substantially discontinuous change from an upper index value and a lower index value, the index gradient being substantially continuous in the same region.

Examples are not restricted to metamaterials. However, the artificial structure of the metamaterial facilitates the provision of carefully tailored index discontinuities and controlled index profiles, and embodiments of the present invention include gradient index metamaterial lenses having improved properties. The use of metamaterials allows the spatial index profile to be controlled at the scale of the unit cell. Typically, unit cell dimensions are somewhat less than the wavelength of electromagnetic radiation of interest, for example less than approximately ⅕ the operational wavelength. Applications include improved radio frequency (RF) devices, including lenses and beam steering devices, in particular automotive radar application, but are not limited to such devices.

Embodiments of the present invention include gradient index (GRIN) lenses. Conventional GRIN lenses present an index gradient, for example having a maximum index at the center of a lens and a minimum index at the periphery. Embodiments of the present invention include metamaterials having a gradient index that varies substantially as a continuously function of distance between the center and the periphery. In a conventional GRIN lens the index may have a generally parabolic profile when plotted against radius. However, in embodiments of the present invention, the index profile includes discontinuities, for example having a segmented parabola form in which segments are offset by constant values over certain spatial ranges where necessary so as to maintain the index profile within an available index range, while allowing a substantially continuous variation in index gradient.

Example lenses according to embodiments of the present invention may have one or more extremum (maximum or minimum) index values at certain positions, at which the index undergoes a substantially discontinuous step to an opposite extremum value (e.g. from a maximum or minimum value, or vice versa). For example the index may transition from a maximum available index for the lens material to a minimum available value for the material at a particular radius, or other distance. Hence the spatial index profile contains steps or discontinuities. However since the step change in index is discontinuous, the effect on the index gradient may be relatively insignificant for a given application.

The index gradient $dn/dr$, where $r$ is a spatial variable, may be substantially continuous over the lens, even where a number of index discontinuities exist in the index profile $n(r)$. For example, an improved lens according to an embodiment of the present invention has an index profile having an index discontinuity at a first position, for example the index increasing substantially discontinuously from a first value to a second value at the first position.

In a representative example, the index increases from a minimum value to a maximum value at the first position, effectively discontinuously, while the index gradient shows little change across the discontinuity. The index gradient may be poorly defined at the discontinuity itself, but this may have little effect on lens behavior.

For example, a material has an index profile $n(r)$ and an index gradient $dn/dr$, where $n(r)$ is the index and $r$ is a spatial variable. The value of $n(r)$ may be a minimum value at $r_1 - \delta r$ and a maximum value at $r_1 + \delta r$, where $\delta r$ is small, possibly negligible. Here, r may be a linear position such as a radius from a center or a distance from an edge, and in particular $\delta r$ may be small compared to $r_1$, the position of the discontinuity, or compared with the overall dimension of the material. Index step resolution may, for example, be related to the unit cell dimension of a metamaterial. For example, $\delta r$ may be less than one-fifth, in particular less than one-tenth of the magnitude of the first radius.

An example gradient index element comprises a material having an index profile and an index gradient profile, the index profile including at least one discontinuity, the index gradient profile being substantially continuous. The index profile may be formed from a plurality of segments, the segments having discontinuities therebetween. Each segment may represent a continuous variation of index with spatial position. Example elements include lenses, and other devices for control or other modification of electromagnetic radiation.

The index profile may be segmented, each segment being separated from adjacent segments by a discontinuity. The segments may be segments of a parabola, with a constant offset where necessary to maintain the index profile within the available index range. A constant offset, such as a stepped offset, does not change the index gradient. Effectively, the index profile may be a continuous function, such as a parabola or linear change, superimposed on a stepped offset function. The stepped offset function includes segments of constant offset with discontinuities between such segments.

In some examples, the index gradient profile may be substantially constant. For example, the index profile may have the appearance of a saw-tooth wave when shown as index versus position. The index profile has segments of linear gradient (linear dependence of index versus position) separated by discontinuities. However, the index gradient of such an index profile may be substantially constant. In some examples, the index gradient profile may have a substantially linear dependence on position, for example if the index profile has a quadratic dependence on position.

An index gradient can be maintained over a spatial extent that is substantially greater than conventional index profiles. For example, a linear index gradient can be maintained over a theoretically unrestricted spatial extent using discontinuities in the index profile to maintain the index profile within an available index range. Similarly, for any form of index profile, a product of the index gradient and the spatial extent can be much greater than the available index range. The product may be a spatial integration of index gradient over the spatial extent.

The index profile may be fabricated in any appropriate material. In particular examples, the material is metamaterial, such as an artificially structured composite material having an index profile and index gradient along a spatial direction. A metamaterial may include at least one substrate supporting a plurality of conducting patterns. The index profile may have at least one discontinuity configured so as to maintain a substantially continuous index gradient. The metamaterial may have a maximum index at a first position and a minimum index at a second position, there being an index range between the maximum index and the minimum index, with at least one discontinuity so as to maintain a substantially continuous index gradient over the spatial extent.

DETAILED DESCRIPTION OF THE PREFERRED EMBODIMENTS

Gradient index lenses can be obtained in a metamaterial using various approaches. An example metamaterial may include a plurality of unit cells. Electromagnetic properties of the metamaterial depend on the relevant wavelength of electromagnetic radiation, and parameters of the unit cells. Typically, the electromagnetic wavelength is greater than unit cell dimensions, for example greater than twice the unit cell dimension and usually greater than five times the unit cell dimension.

A metamaterial comprising a plurality of unit cells may be fabricated having one or more unit cell parameters that have a spatial variation some or all of the metamaterial. Hence, a metamaterial can be made having an index gradient, wherein the index varies with spatial position. The index gradient may arise from variations in unit cell parameters that are introduced during manufacturing, and/or controllable variations in unit cell properties. For example, a variable capacitance within a unit cell may be varied using an electrical control signal.

For a particular application, a desired index curve may be determined. For example, a gradient index lens may be designed using a design equation, for example having a parabolic desired index curve. In other applications, a desired index curve may be linear with a spatial position. However, a desired index curve may have portions that lie outside of maximum and/or minimum index for a given medium, for example as a consequence of fabrication limitations of a metamaterial. In such cases, it is conventionally impossible to obtain the desired index curve without using a material of different properties, or by adjusting other parameters. In the case of a metamaterial gradient index (GRIN) lens, it may be necessary to increase the value of lens thickness or otherwise redesign the lens to bring the desired index curve within available material index range.

A desired index profile n(r) has an associated desired index gradient dn/dr, where n is the index and r is a spatial variable. In embodiments of the present invention, a material is desired having the desired index gradient, dn/dr, while the index curve is segmented and adjusted by a stepped offset so as to remain within the available index range. Hence, an improved gradient index lens may be obtained by segmenting the desired index profile, and shifting the segments over by an offset over one or more spatial ranges so as to obtain an index profile within the available index limits, while obtaining the desired index gradient dn/dr.

Hence, using discontinuities in the index profile, a substantially continuous spatial index gradient dn/dr may be maintained over a greater distance than is possible if the index is also a continuous function of distance. For example, in embodiments of the present invention, there is no practical limit beyond the dimensions of the lens itself on the extent of an index gradient dn/dr, where r is a positional variable. For a conventional lens, the index gradient would be limited by the maximum available index range ($n_{max}-n_{min}$). For example, a linear gradient could not be conventionally extended beyond a distance ($n_{max}-n_{min}$)/(dn/dr).

In the example of a metamaterial, one or more unit cell parameters can readily be varied during a fabrication process. For example, an electrically conducting pattern may have a parameter such as inductance, capacitance (such as capacitive gap), shape, conductivity, substrate property, or other structural feature that may be imparted with have a spatial variation.

Similarly, the properties (such as composition, permittivity, or other parameter) of a dielectric substrate may be varied to adjust a unit cell parameter. Unit cell parameters may be constrained to a range, for example by manufacturing limitations. For example, the capacitive gap of an electrically-coupled LC resonator, here a split ring resonator, can be varied using changes in physical dimensions. Also, the capacitive gap can be adjusted by applying an electric field to a varactor or similar component having an electric field dependent capacitance. This allows the unit cell parameters to be adjusted dynamically. The capacitance of a unit cell can be adjusted using a control signal such as an electric signal.

The available index range for a given metamaterial may be constrained within a range, for example having a maximum index and a minimum index values. The available index range may be limited between the maximum and minimum values. Example limitations include a feature length of a conducting pattern, such as capacitive pad length in a resonator unit cell. Further, impedance matching considerations may also put one or more constraints on unit cell parameters.

Metamaterials allow great flexibility in creating refractive index profiles. Metamaterials may be fabricated using feature sizes (such as unit cell dimensions) appropriate for operation at various electromagnetic wavelengths, such as radio wavelengths (including radar wavelengths), far-IR, IR, visible, UV, and the like. A discontinuity in index profile may be at the size scale of a unit cell, hence significantly less than the wavelength of the incident radiation at an operational frequency.

Figure 1A:
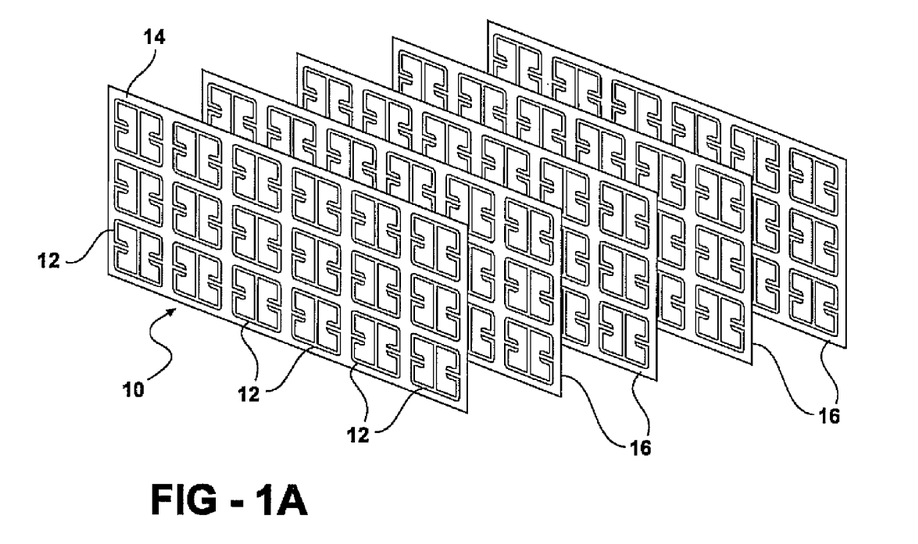
FIGS. 1A-1B illustrate a metamaterial having a plurality of resonators.

FIG. 1A illustrates a conventional metamaterial 10, comprising at least one substrate 14 on which a plurality of conducting patterns 12 are disposed. In this example, a plurality of substrates are used, the additional substrates 16 being generally parallel to substrate 14 and spaced apart. In this figure, the spacing is exaggerated for illustrative clarity.

Figure 1B:
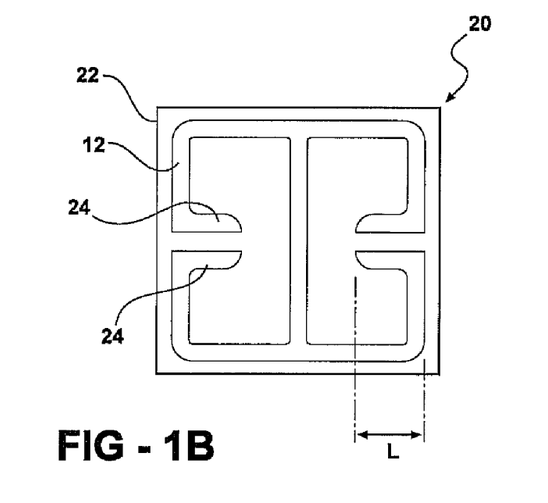

FIG. 1B shows a conventional unit cell including a conducting pattern, in this case an electrically-coupled LC resonator, which may be used in a metamaterial. The unit cell shown generally at 20 includes conducting pattern 12, having the same form as shown in FIG. 1A. A capacitive gap is formed by capacitive pads 24 having a pad length. In this example, the pad length has the same value for both capacitive gaps. The periphery of the unit cell 22 need not correspond to any physical structure, the dimensions being related to the pattern repeat on the substrate surface. In this example, the pad length is a feature length L, variation of which allows index to be varied.

A conventional metamaterial includes a repeating pattern having constant values of pad lengths. The properties of the metamaterial are related to parameters of the unit cell, such as the pad length.

Figure 1C:
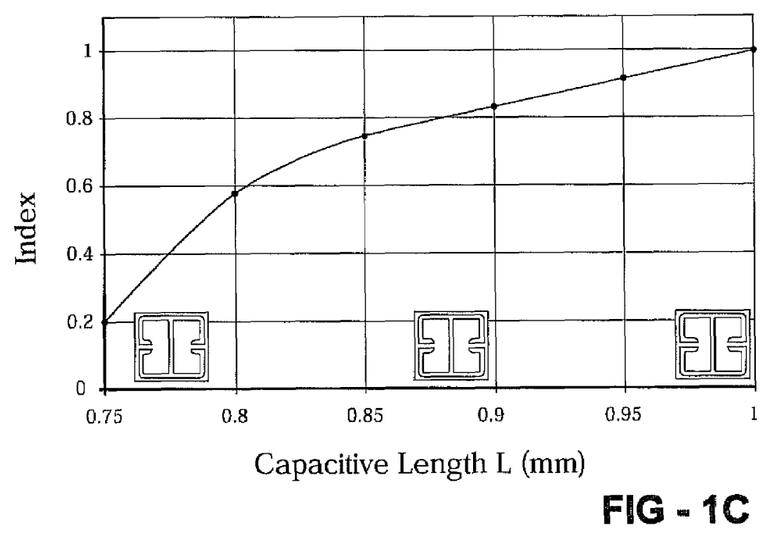
FIG. 1C shows a representation of the variation of index on capacitor pad length for the structure of FIG. 1B.

FIG. 1C shows how the index of a metamaterial may vary with a capacitive pad length. The index is lower for shorter values of pad length, such as shown at 30, and greater for larger values of pad length, for example as shown at 32. Curves such these may be readily determined experimentally or using a simulation. The feature length/index curve shows the relationship between the index n(r) and a feature length L. The index can only vary within an available index range defined by n(max) and n(min), and this constraint arises from the values of L(min) and L(max), typically determined by fabrication limitations. A desired index curve can be used to design a conventional gradient index lens. However, the constraints on index conventionally place severe limitations on any such lens design.

In this example, the index of a metamaterial is a function of the capacitive pad length. Hence, variations the capacitive pad length may be used to determine electromagnetic response of the unit cell. A shorter pad length corresponds to a smaller capacitance of the corresponding capacitive gap. By varying a feature size, such as pad length, as a function of spatial position, a gradient index metamaterial may be obtained.

Figure 1D:
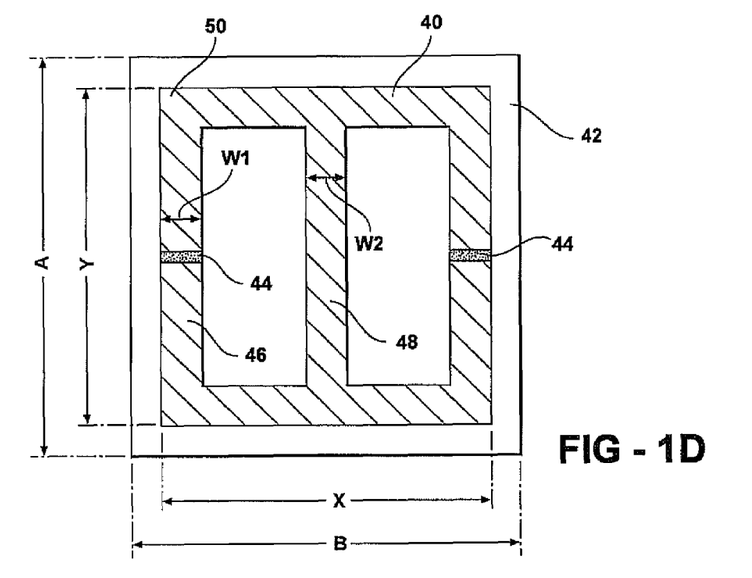
FIG. 1D illustrates representative unit cell parameters.

FIG. 1D illustrates various unit cell parameters for a possible unit cell 42, including unit cell dimensions (A and B), conducting pattern outside dimensions (X and Y), and track width such as W1 and W2 for side and central conducting arms respectively. This example shows a capacitive pad length at capacitive gap 44 equal to the track width W1 of conducting lengths 42 and 46, which may be the lowest practical limit.

In some embodiment of the present invention, the capacitive gap shown generally at 44 may comprise a turnable element, such as a varactor diode, ferroelectric material, or the like, so that the capacitance of the capacitive gap may be dynamically adjusted using an electrical control signal.

The minimum value of the pad length may be the track width of a conducting pattern, such as W1 of FIG. 1D. The maximum length is constrained by the separation distance between the central segment 16 and the capacitive gap 14.

Additional variations of unit cell parameters, such as capacitance of a capacitive gap, may be obtained using other approaches, such as variations in other parameters, or using a tunable dielectric. For example, a capacitive gap such as 44 may include an electrically tunable capacitor, such as a variable permittivity material, varactor diode, and the like.

However, typically there will be a range of index within which the fabricated metamaterial is restricted.

Gradient index lenses have numerous applications. One approach to fabrication of a gradient index (GRIN) lens is to determine a required index profile, then to fabricate a lens having or approximating the desired profile.

An example design equation is shown below (Equation 1):

$$n(r) = n_{max} - \frac{\sqrt{r^2 + f^2} - f}{d} \qquad \text{(Equation 1)}$$

Figure 2:
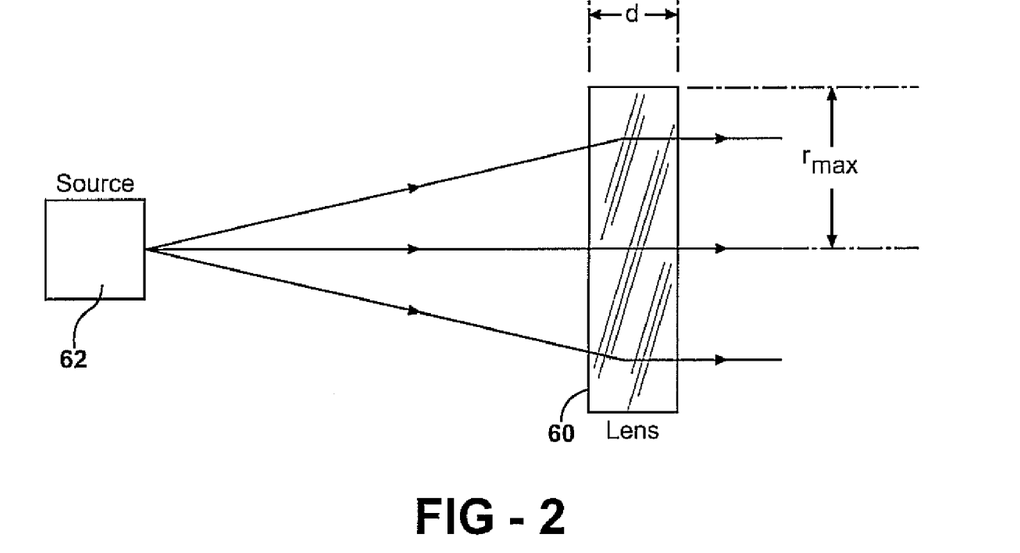
FIG. 2 illustrates operation of a gradient index lens.

FIG. 2 shows a gradient index lens, in reference to terms used in Equation I. In the example of FIG. 2 the focal length f is the distance between the source and the lens, so that a parallel beam emerges. The lens thickness d, and peripheral radius of the lens $r_{max}$ are shown. In this example, the lens may be generally disk shaped, having a circular profile and uniform cross-section. However, a lens may alternatively have a generally rectangular or cuboid form, presenting flat faces to incident and transmitted radiation. In this example, the term r represents radial distance from the center of the lens, but in other application may represent another spatial variable. In many applications, it is desirable to minimize the lens thickness d and further to minimize the radius $r_{max}$, to make as compact lens as possible.

Figure 3:
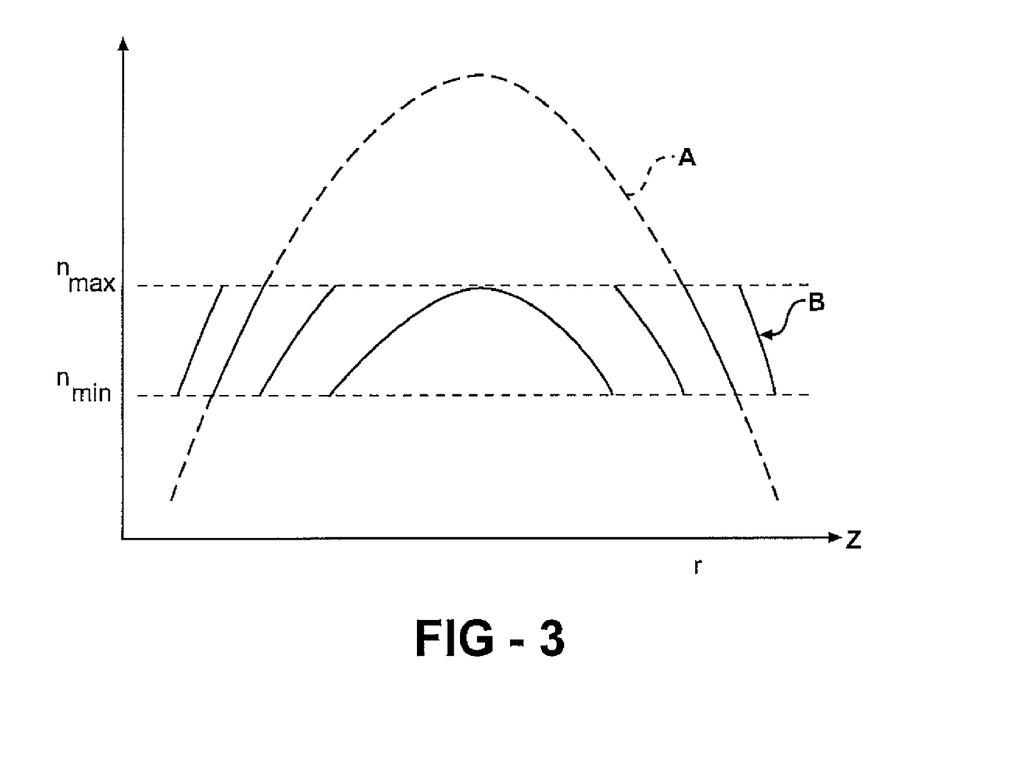
FIG. 3 shows a desired index profile, limitations on index for a material used, and an index profile according to an embodiment of the present invention.

FIG. 3 shows a desired index curve A determined by an equation such as Equation 1 for a given focal length, lens thickness, and peripheral radius of a lens. The curve, shown as a dashed line, has a generally parabolic form. FIG. 3 further illustrates maximum and minimum index values, for example as a consequence of fabrication limitations, for a metamaterial index of a given design. The horizontal dashed lines show the maximum index is $n_{max}$ and the minimum index $n_{min}$, and define a range of available index values. The desired index curve only exists for a small portion of the total extent within the available index values. It is apparently impossible to obtain the required curve using the given metamaterial. Conventionally, it would be necessary to increase the value of lens thickness or otherwise redesign the lens to obtain the desired index curve and performance. This may significantly reduce the advantage of using a metamaterial, and reduces the compactness of the lens.

However, gradient lens performance is correlated with the index gradient, dn/dr. An improved gradient index lens may be obtained by segmenting the desired index profile, and shifting the segments by a constant value over the extent of a segment, as necessary to obtain an index profile within the available index limits, while obtaining the desired dn/dr.

FIG. 3 further shows an index profile at curve B that provides the desired index gradient dn/dr, while the index profile itself n(r) remains within the available index range determined by material and/or fabrication limits. Curve B represents the index n(r) versus a spatial dimension labeled r. For example r may be a radial distance from the center of a lens or other element. However, the invention is not restricted to circular lens, and this approach may be used for other optical elements, and r is not limited to radial distances and may be any spatial parameter such as distance from a center line or edge. The index profile may be a refractive index or equivalent at optical, IR, UV or other wavelength. The index may be determined for a metamaterial using effective index theory, for example as described in Int. Pub. WO2006/023195 to Smith et al., and embodiments of the present invention include both positive and negative index materials.

The form of the index profile B resembles the surface profile of a conventional Fresnel lens, such as the well known plastic Fresnel lenses used in overhead projectors, automobile lamps, and lighthouse lenses. However, the lens need not have a textured surface. In some examples, for example in the case of optical materials, a textured surface such as associated with a conventional Fresnel lens may be combined with an index profile according to an embodiment of the present invention to obtain further desirable properties of an element.

In this example, curve B includes steps or discontinuities in the index values at particular values of r, selected when the desired index profile would otherwise go outside the limits of the available index range. Curve B is represented by the solid line segments between $n_{max}$ and $n_{min}$. The index gradient may have a form suggested by Equation 1, but in other examples a linear index gradient or other spatial variation may be desired.

Figure 4:
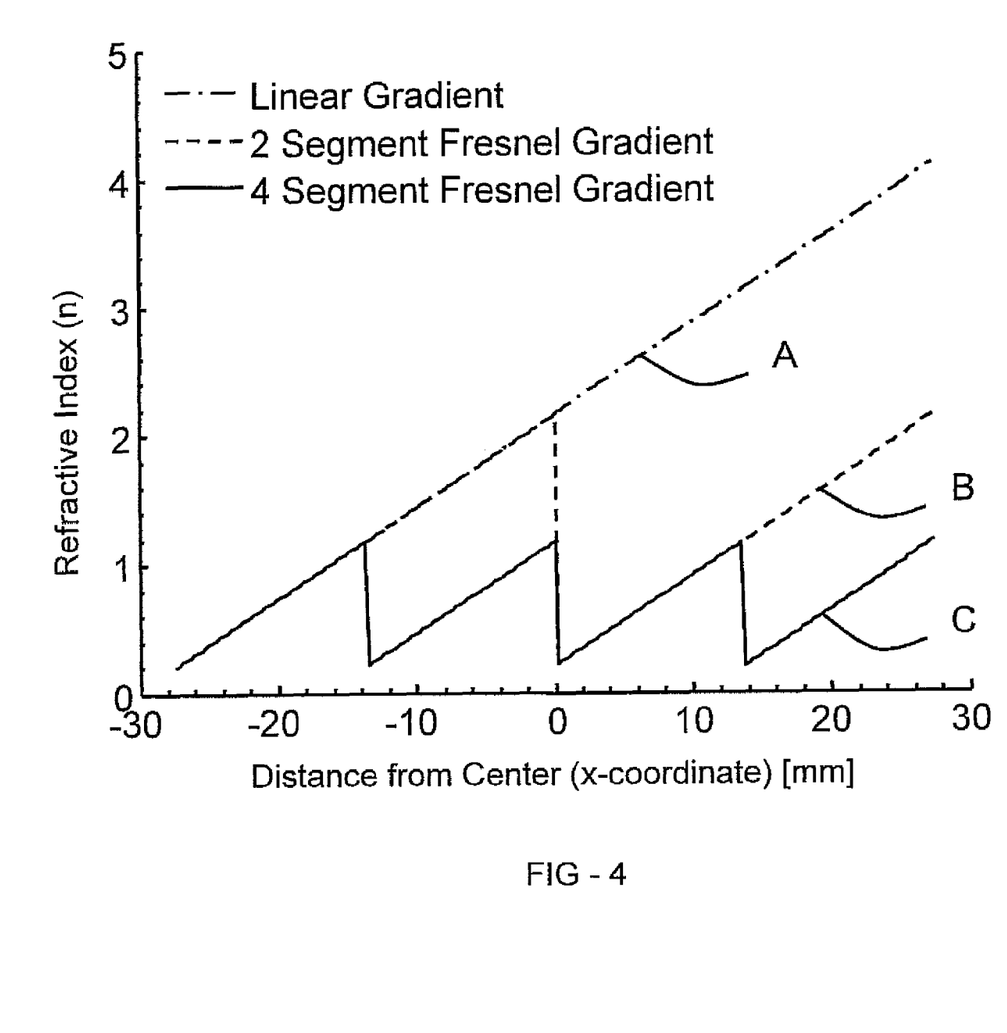
FIG. 4 shows a desired linear index gradient, and a segmented index gradient according to an embodiment of the present invention.

FIG. 4 shows a possibly desired linear index gradient A (dot-dash line). Curve B (dashed line) is a two-segment index profile, which may also be referred to as a Fresnel gradient, which provides the index gradient of curve A in two discontinuous segments. Curve C (solid line) shows a four-segment Fresnel gradient used to obtain the desired linear gradient.

Here, the term "Fresnel gradient" is used to refer to an index profile having one or more discontinuities in index versus spatial dimension, which also provides a substantially continuous, or in some cases constant, index gradient profile. The term "profile" refers to the value of a parameter as a function of position.

Figure 5A:
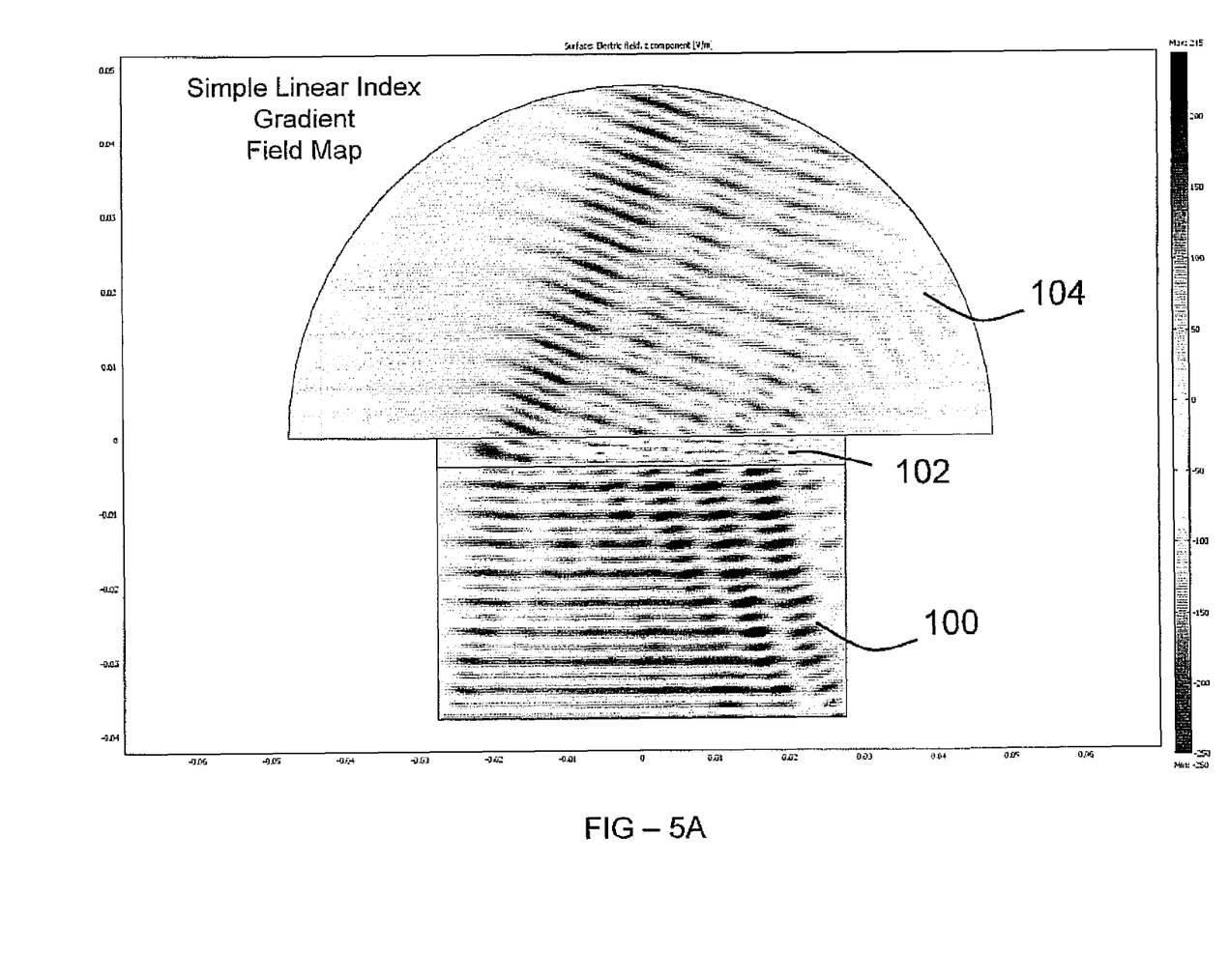
FIGS. 5A and 5B show a field map and far field electric field magnitudes for a linear gradient lens.
Figure 5B:
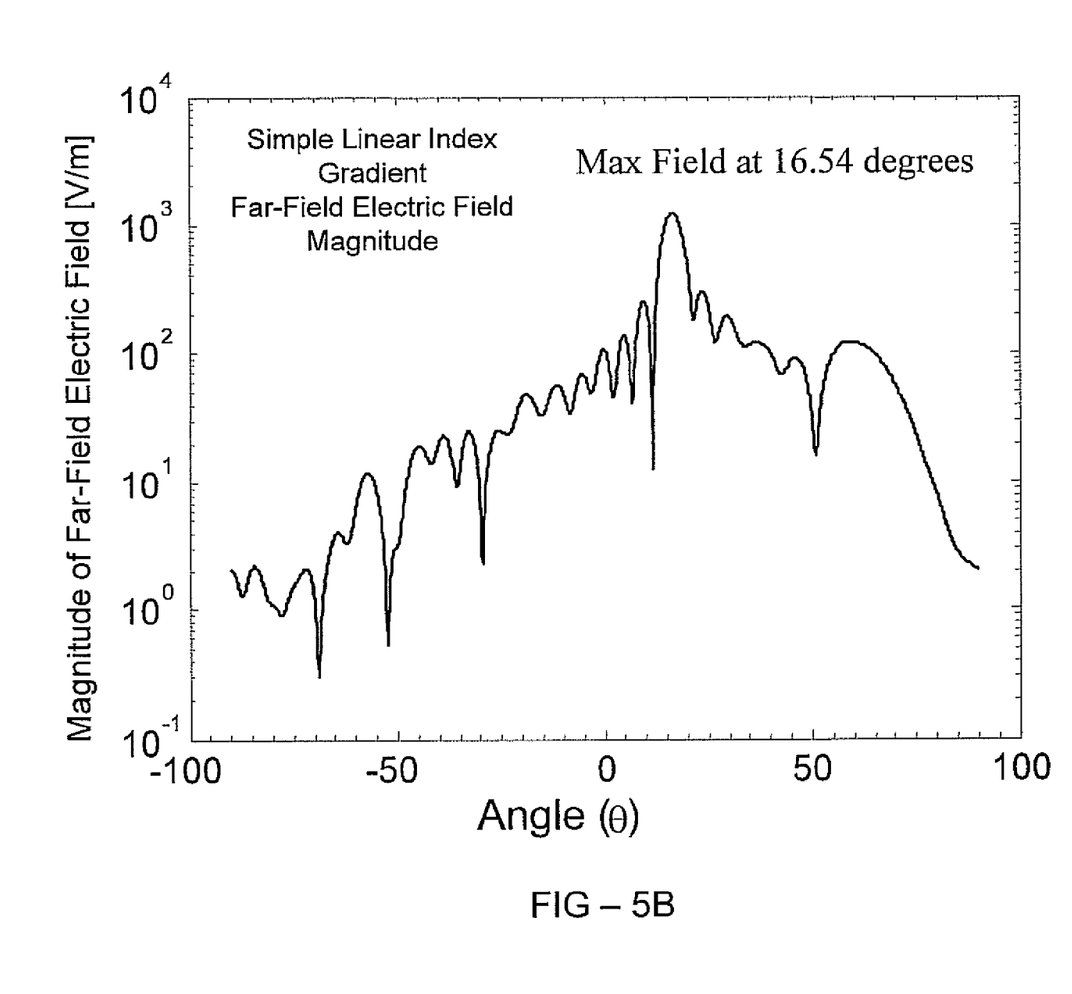

FIGS. 5A and 5B show a field map and far field electric field magnitude plot respectively for a linear gradient lens shown at 102 in FIG. 5A, with radiation incident along 100 and emerging at 104. This example illustrates the performance of a linear gradient refractive lens having an index profile similar to that shown as curve A in FIG. 4. for a lens thickness 5 mm and aperture width 55 mm. The plots were simulated, so in this case there were no material limitations and a comparison can be made to a non-segmented index profile.

Figure 5C:
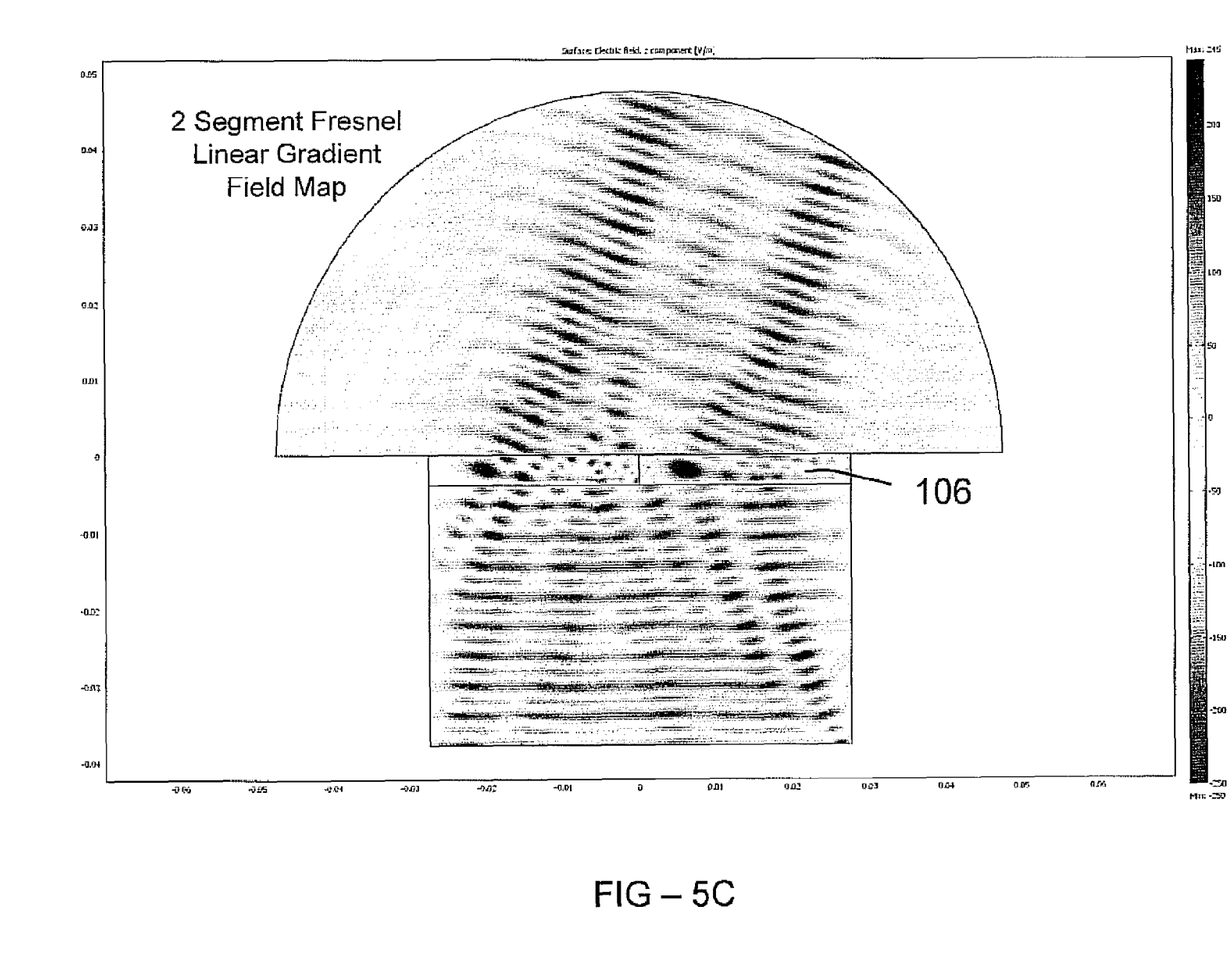
FIGS. 5C and 5D show a field map and far field magnitudes for a two-segment lens according to an embodiment of the present invention.
Figure 5D:
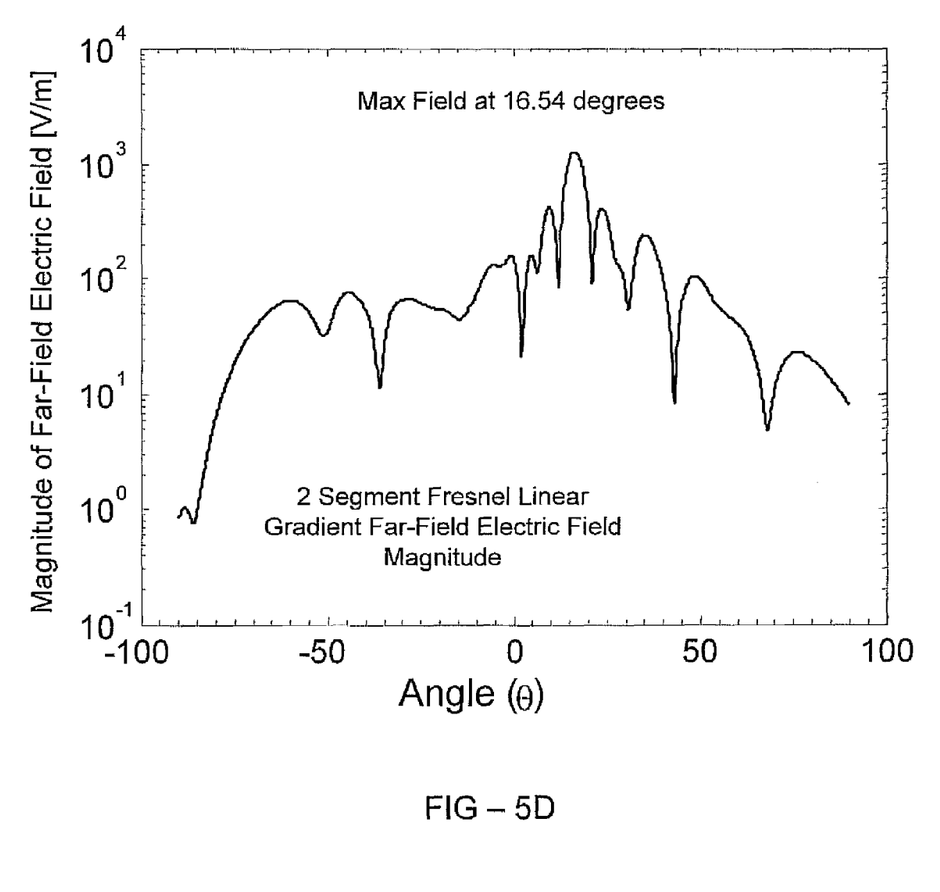

FIGS. 5C and 5D show a field map and far field for the two-segment linear gradient lens shown at 106 in FIG. 5C, corresponding to index profile B in FIG. 4. As can be seen, similar performance is obtained even though curve B requires a reduced range in material index compared with index profile A. An N segment Fresnel gradient index lens may have N−1 steps or discontinuities, so that the lens may have N continuous index profile segments separated by N−1 discontinuities.

Figure 5E:
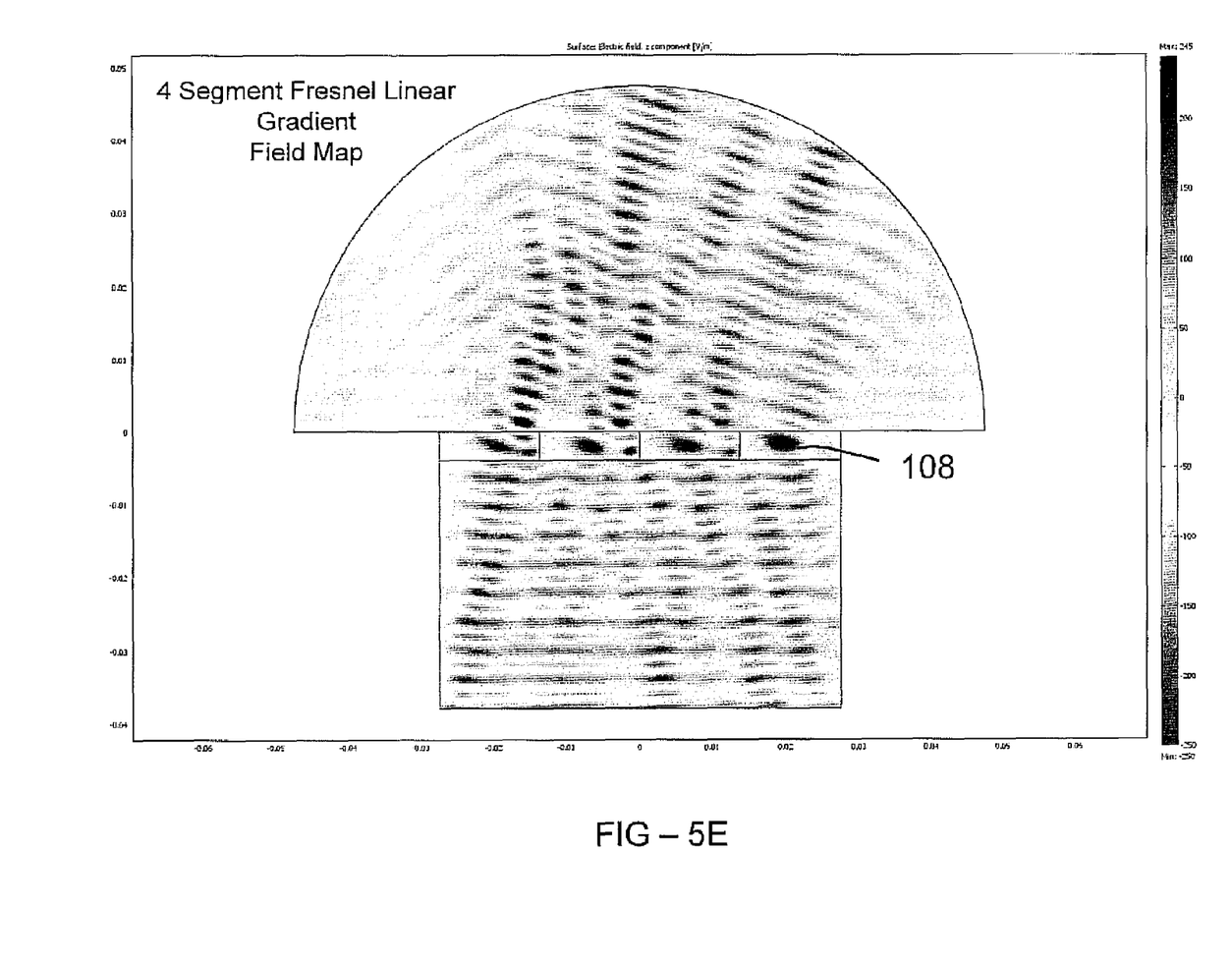
FIGS. 5E and 5F show a field map and far field magnitudes for a four-segment lens.
Figure 5F:
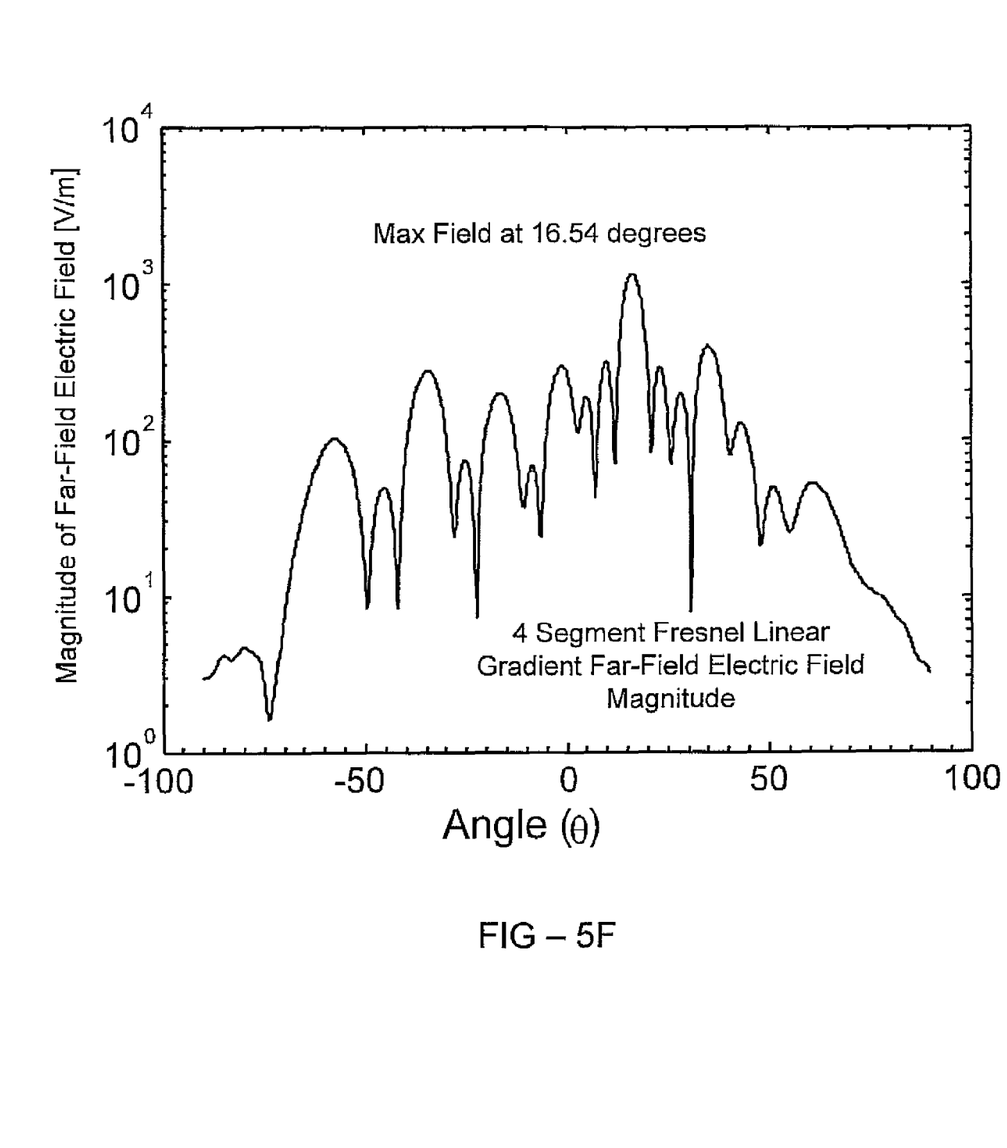

FIGS. 5E and 5F show a field map and far field values for a four-segment lens shown at 108 in FIG. 5E, corresponding to index curve C in FIG. 4. Again, this lens shows reasonable performance in comparison with the conventionally required index profile A, while using a significantly narrower index range than required by curve A. For a required linear gradient, the range in metamaterial index required can be reduced by a factor of two or four, using a two- or four-segment Fresnel variation respectively. This loosens the fabrication requirements of the metamaterial, and may allow dynamic control using varactors or other adjustable capacitive devices where a conventional approach would not be achieved due to limitations in capacitive variation obtainable.

The index gradient of an N segment Fresnel index gradient lens may be substantially continuous, and a monotonic function. If the index step is a discontinuity having no appreciable spatial extent, the gradient will be substantially continuous. For example, the spatial extent of the step from minimum index to maximum index may be small compared to the dimensions of the lens.

Metamaterial Lenses and Other Applications

Metamaterial lenses may comprise one or more layers, where the term layer is used to include two-dimensional arrays of unit cells. For example a layer may be formed by conventional printed circuit board technology. Three-dimensional structure may be achieved using posts between substantially parallel dielectric substrates on which pattern conducting forms are printed.

The spatial distribution of unit cell parameters may be obtained using manufacturing variations and/or dynamic adjustments obtained using a control signal.

For example a unit cell parameter may vary smoothly from one spatial location to another, and then incur a discontinuity to another value, from which the smooth variation continues.

In the case of a circular lens, a unit cell parameter may have a maximum value at the center, and then fall in a smooth fashion to a minimum value at a first radius. The parameter may then undergo a discontinuous step to the maximum value from which it then falls continuously to the minimum value again at a second radius. The resulting curve may be essentially a parabolic form having segments displaced relative to each other to minimize the extent along the index value axis.

Figure 6:
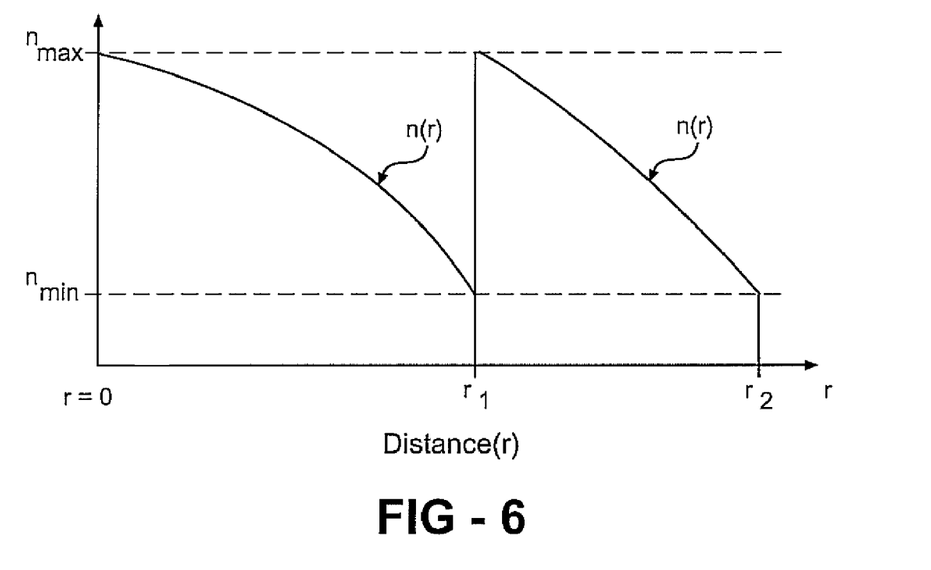
FIG. 6 further illustrates a possible spatial variation of unit cell parameter for an example metamaterial.

FIG. 6 shows an index profile having a first maximum at the center, a first minimum near the first radius $r_1$, a discontinuous step to a second maximum (for example, at $r_1+\delta r$), the index then falling as a continuous function within the following segment to a second minimum at the second radius $r_2$. Here, the ordinate is correlated with the index, and the abscissa represents a spatial dimension such as radius or linear distance.

In other examples, an index profile may be obtained having the maximum and minimum positions reversed relative to FIG. 6. For example the index may have a minimum value at the center, rising to a first maximum at the first radius, and so on.

A spatially varying unit cell parameter may correlate with an effective index at an electromagnetic frequency of interest, for example an operating frequency. The effective index may be averaged over a plurality of unit cells in a metamaterial, the unit cell dimension being less than a wavelength of the electromagnetic radiation. In some examples, the wavelength may be at least 5 times a unit cell dimension. It may be arguably technically incorrect to refer to an index of a single unit cell, as typically a plurality of unit cells is exposed to the electromagnetic radiation. However, where such a term is used, this can be defined as an effective medium response of a sufficient plurality of such unit cells to the electromagnetic radiation. For example, the "index" of a unit cell may be thought of as equivalent to the index of a uniform metamaterial of such unit cells.

A unit cell parameter may be a capacitive gap of a resonator, such as a split ring resonator, other capacitor, unit cell dimensions such as repeat directions in a direction along R or an orthogonal direction, conducting pattern dimensions, form of dielectric substrate, dynamically variable component, or other adjustable parameter, The smooth curves of FIG. 6 may assume a large number of unit cells compared with the spatial distances involved. In some examples, the number of unit cells may not be sufficient to give such an exactly smooth curve, however such examples are within the scope of the present invention.

Example lenses include both positive and negative refractive index lenses. Lenses may be circular, square or have some other shape. Example devices according to the present invention include other applications of gradient index metamaterials besides lenses.

The surface profile of a lens may be generally planar, focusing occurring largely due to an index gradient. Lenses and other elements may have a generally rectangular cross section. However, other examples include elements having a variable thickness, for example a variable number of layers within a metamaterial. Enhanced diffractive effects may be obtained using such an approach. For example, a surface may be stepped through having a variable number of metamaterial substrate layers.

Metamaterials may be doubly negative (negative permittivity and negative permeability) at the frequency of operation. However, the invention is not limited to doubly negative materials, and includes any use of metamaterials in control of electromagnetic radiation. Applications may further include diffractive, refractive, and reflective elements.

The unit cell parameter may be resonance frequency, as in some frequency domains the permittivity and hence index varies with resonant frequency. Resonant frequency may be adjusted using any approaches discussed above, for example using an adjustable capacitance, shape, size, or other configuration of conducting pattern. Resonant frequency may also be modified using patterning of the dielectric substrate surface.

Using a segmented index profile, for example as in examples of the present invention, allows a higher optical power lens to be made using a material, such as a metamaterial, having upper and lower limits on available index.

Other Applications

Applications include compact high power lenses for millimeter wave lens based radar systems or imaging systems. Examples include beam steering and/or control of electromagnetic beams, including refractive beam steering devices, RF applications, adjustable lenses, and other optical elements. Applications include elements functional at optical wavelengths, IR, UV, terahertz, and radio wavelengths. Particular examples include beam controllers for radar applications, in particular automotive radar applications such as collision avoidance radar for an automobile.

A high resolution radar beam may be created using a lens according to an embodiment of the present invention. Beams may also be steered, for example by dynamically changing an index gradient in the metamaterial lens using a control signal.

Other applications include radiation reflectors, radiation absorbers, and other electromagnetic beam control devices such as beam steering devices.

Embodiments of the present invention may further include dynamic control of index properties. For example, the use of tunable elements such as varactor diodes in a metamaterial unit cell allows index profiles to be dynamically varied. A spatial variation of control voltage may resemble and allow an index profile according to an embodiment of the present invention. Applications include beam steering devices in which a spatially variable bias voltage is applied across tunable elements within the metamaterial, so as to provide a variable index or gradient index lens. A gradient index lens may be used to modify the direction of an emergent beam in a radar or other device, and the beam may be scanned in one or more planes. Such a configuration is useful for automotive applications, for example adaptive cruise control, parking assistance, hazard recognition systems, and the like.

Example applications of the present invention include metamaterial lenses, such as lenses in which the spatial variation of refractive index has discontinuities allowing a broad range of refractive index gradients to be achieved while staying within a limited range of achievable refractive index. A graph of refractive index versus distance may resemble the surface profile of a conventional Fresnel lens.

However, embodiments of the present invention include index profiles formed in other materials, such as optical materials such as glass. Such lenses may be fabricated by assembling sections of optical material, which may then be fused together to obtain a monolithic optical element having a desired index profile. Alternatively, a medium may be processed to obtain a desired index profile, for example using heat, radiation, dopants, diffusive treatments, or some combination thereof.

Metamaterials allow great flexibility in creating refractive index profiles. Metamaterials may be fabricated using feature sizes (such as unit cell dimensions) appropriate for operation at various electromagnetic wavelengths, such as radio wavelengths (including radar wavelengths), far-IR, IR, visible, UV, and the like. A discontinuity in index profile may be at the size scale of a unit cell, hence typically significantly less than the wavelength of the incident radiation of interest.

The invention is not restricted to the illustrative examples described above. Examples are not intended as limitations on the scope of the invention. Methods, apparatus, compositions, and the like described herein are exemplary and not intended as limitations on the scope of the invention. Changes therein and other uses will occur to those skilled in the art. The scope of the invention is defined by the scope of the claims.

I claim:

1. An apparatus, the apparatus being a gradient index element formed from a material,
the material having an index profile and an index gradient profile,
the index profile including at least one discontinuity,
the index gradient profile being substantially continuous,
the material being a metamaterial.

2. The apparatus of claim 1, the apparatus being a gradient index lens.

3. The apparatus of claim 1, the index profile including segments, the segments having discontinuities therebetween.

4. The apparatus of claim 3, the segments representing a parabolic index profile.

5. The apparatus of claim 4, the index gradient being substantially constant.

6. The apparatus of claim 1, the index profile being a refractive index profile at an optical or IR wavelength.

7. The apparatus of claim 3, the segments representing a linear index profile.

8. The apparatus of claim 1, the index profile being an index profile at a radar wavelength.

9. An apparatus, the apparatus being a gradient index element formed from a material, the material having an index profile and an index gradient profile, the index profile including at least one discontinuity, the index gradient profile being substantially continuous, the index profile including segments, the segments having discontinuities therebetween, the segments representing a parabolic index profile.

10. The apparatus of claim 9, the index gradient being substantially constant.

11. An apparatus, the apparatus being a gradient index element formed from a material, the material having an index profile and an index gradient profile, the index profile including at least one discontinuity, the index gradient profile being substantially continuous, the index profile including segments, the segments having discontinuities therebetween, the segments representing a linear index profile.

12. An apparatus, the apparatus being a gradient index element formed from a material, the material having an index profile and an index gradient profile, the index profile including at least one discontinuity, the index gradient profile being substantially continuous, the index profile being an index profile at a radar wavelength.

13. A metamaterial, the metamaterial being an artificially structured composite material having an index profile along a spatial direction, the index profile having an index gradient along the spatial direction the index profile having at least one discontinuity, the index gradient being substantially continuous.

14. The metamaterial of claim 13, the metamaterial including at least one substrate supporting a plurality of conducting patterns.

15. The metamaterial of claim 14, the plurality of conducting patterns having a spatially dependent variation that provides the index profile.

16. The metamaterial of claim 13, the metamaterial including a plurality of unit cells, each unit cell including a conducting pattern and at least one tunable element, the index profile of the metamaterial being dynamically adjustable using the tunable elements.

17. The metamaterial of claim 13, the metamaterial having a maximum index at a first position and a minimum index at a second position, there being an available index range between the maximum index and the minimum index, a substantially continuous index gradient existing over a spatial extent, there being at least one discontinuity in the index profile within the spatial extent, a product of the spatial extent and index gradient being substantially greater than the available index range.

18. The metamaterial of claim 17, the index gradient being a constant value over the spatial extent.

19. A gradient index lens including the metamaterial of claim 13.

\* \* \* \* \*

UNITED STATES PATENT AND TRADEMARK OFFICE
CERTIFICATE OF CORRECTION

PATENT NO. : 7,570,432 B1  
APPLICATION NO. : 12/027337  
DATED : August 4, 2009  
INVENTOR(S) : Serdar H. Yonak Page 1 of 1

It is certified that error appears in the above-identified patent and that said Letters Patent is hereby corrected as shown below:

Column 4, line 6 after "variation" insert --over--

Column 5, line 57 after "variations" insert --in--

Column 6, line 3 replace "lengths 42 and" with --length--

Column 6, line 6 replace "turnable" with --tunable--

Column 6, line 13 replace "16" with --48--

Column 6, line 13 replace "14" with --44--

Column 6, line 34 replace "Equation I" with --Equation 1--

Signed and Sealed this

Tenth Day of November, 2009

David J. Kappos  
*Director of the United States Patent and Trademark Office*